C. E. BIRD.
SCALE.
APPLICATION FILED FEB. 28, 1917.

1,274,977.

Patented Aug. 6, 1918.
4 SHEETS—SHEET 1.

Witnesses.
A. H. Opsahl
H. L. Opsahl.

Inventor.
C. E. Bird.
By his Attorneys
Williamson Merchant

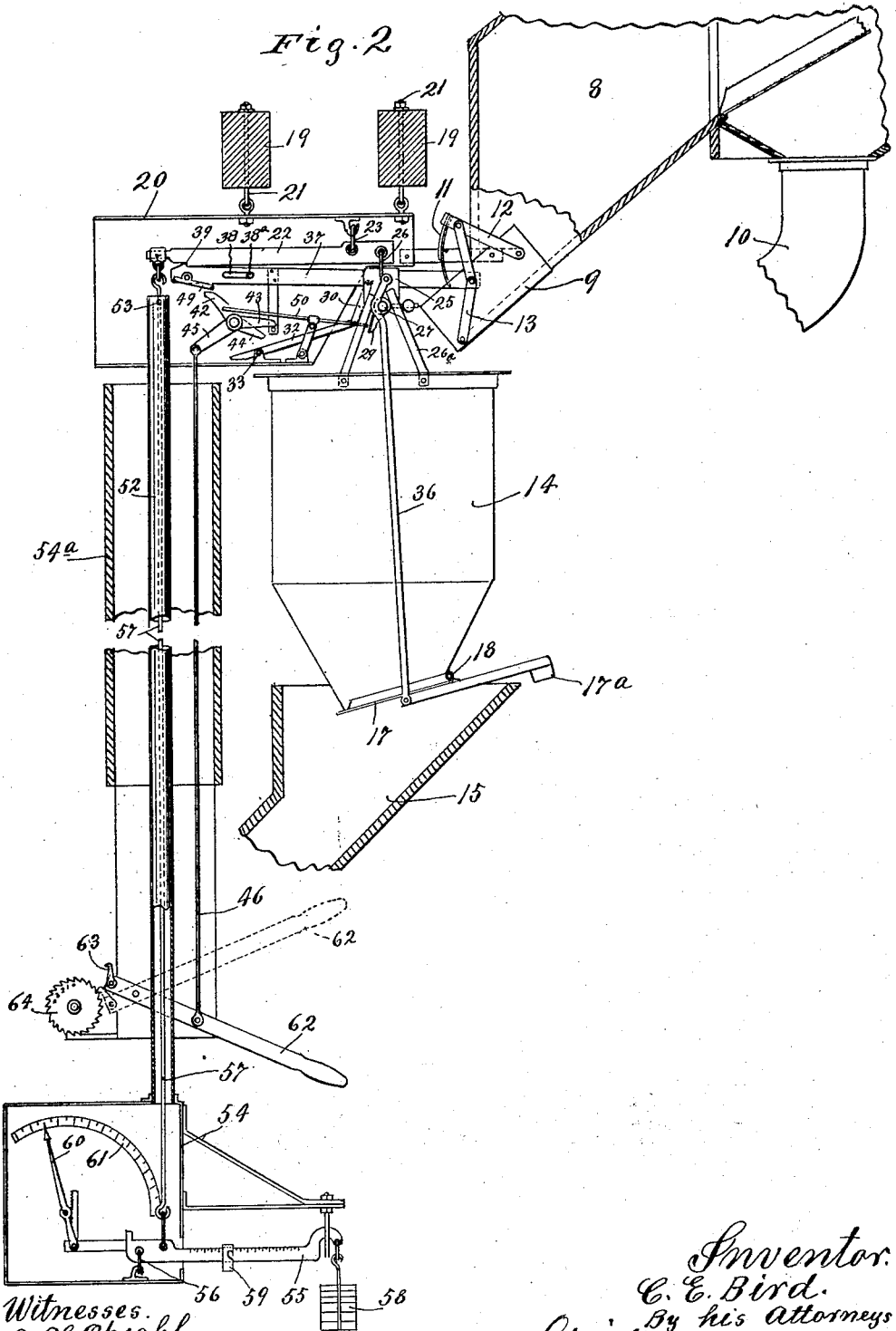

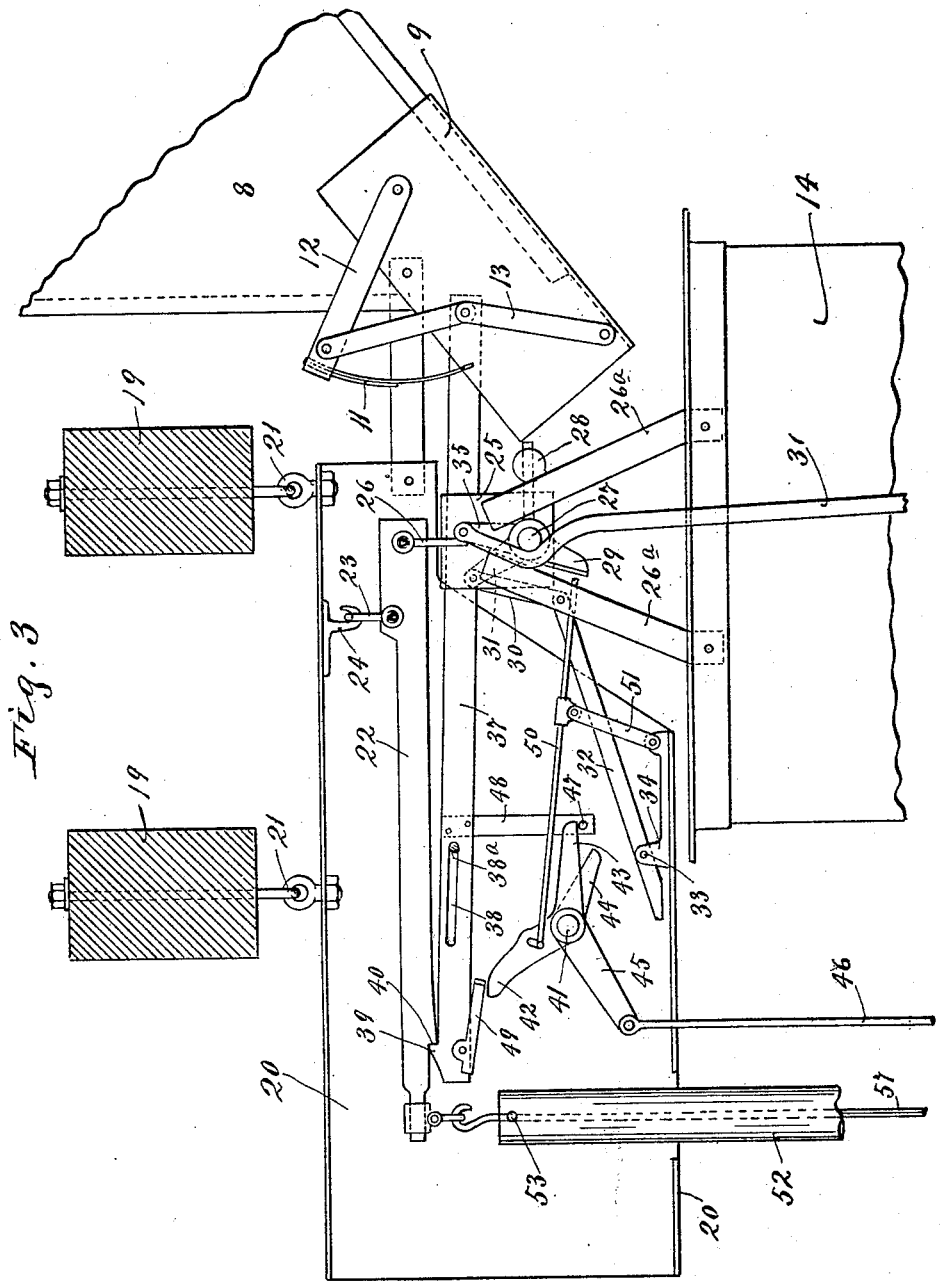

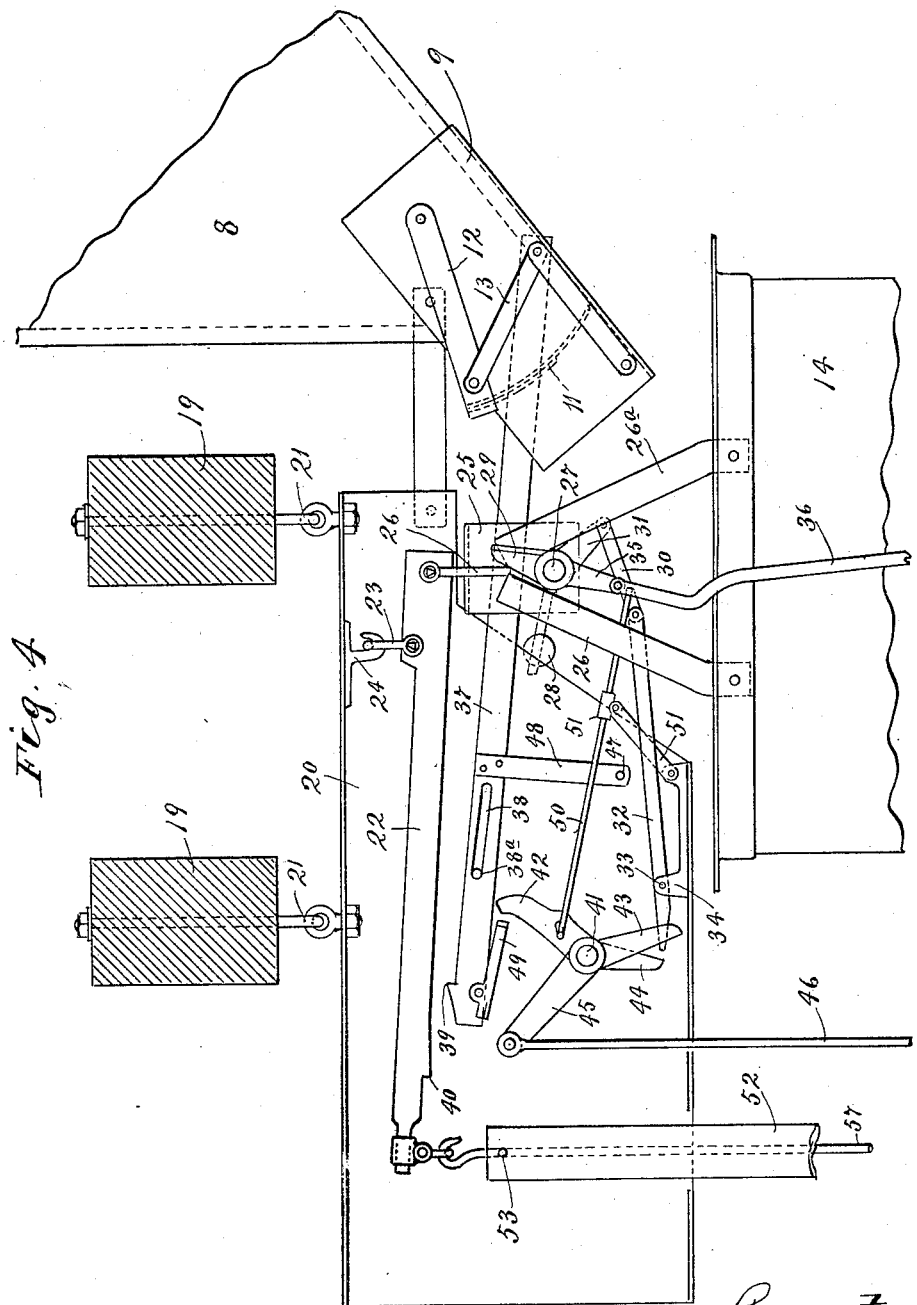

UNITED STATES PATENT OFFICE.

CHARLES E. BIRD, OF MINNEAPOLIS, MINNESOTA.

SCALE.

1,274,977. Specification of Letters Patent. Patented Aug. 6, 1918.

Application filed February 28, 1917. Serial No. 151,464.

*To all whom it may concern:*

Be it known that I, CHARLES E. BIRD, a citizen of the United States, residing at Minneapolis, in the county of Hennepin and State of Minnesota, have invented certain new and useful Improvements in Scales; and I do hereby declare the following to be a full, clear, and exact description of the invention, such as will enable others skilled in the art to which it appertains to make and use the same.

My invention has for its object to provide an improved scale especially adapted for use in grain storage and country elevators, where grain is weighed and then delivered to cars on the track. Generally stated, the invention consists of the novel devices and combinations of devices hereinafter described and defined in the claims.

Scales for the above noted purpose have hitherto been of one or the other of the following types, to wit: on one instance, the scale mechanism and hopper have been located on the ground floor, the grain weighed and then elevated, and thereafter directly delivered to the car; and in the other instance, the scale beam has been located on the ground floor, the scale levers and hopper have been located in the superstructure of the elevator and the weighed grain spouted from the scale hopper into the cars. In the latter noted arrangement, the scale beams have been connected to the scale levers through connections mounted on, or guided by guiding devices forming part of, or otherwise connected to the elevator structure. It is a well known fact that all elevators will not only settle, but, in settling, will move from true vertical position, and hence, it has resulted that in the second above noted construction, the settling of the elevator would throw the scale mechanism out of level so that it would no longer accurately weigh.

My invention obviates the disadvantages of both of the above noted scale arrangements in an extremely simple and efficient manner. An important feature of the invention consists in suspending the scale beam and beam box or support from the elevated scale levers, or mechanism, by means of gravity-arighted pendulum or connection which is unrestrained by the elevator structure, and will always hang in a true perpendicular position, regardless of settling, shrinking, or tilting of the elevator or building in which the scale is installed. Otherwise stated, the so-called depending column is hung at its upper end and is free at its lower end, so that under the action of gravity, it will automatically assume an approximately vertical position even if the building should settle or tilt slightly.

The scale hopper, and scale levers, and the like, are located at the top of the grain bins, and the scale beam is located low down and below the bins where it may be manipulated from the ground floor, and the weighed grain is spouted from the scale hopper directly to the cars.

The invention also involves certain novel features of improvement in the scale mechanism proper, whereby it is made impossible to open the gate of the garner while the gate of the scale hopper is open, or to open the gate of said hopper while the gate of said garner is open.

The improved scale, in its preferred form and embodiment, is illustrated in the accompanying drawings, wherein like characters indicate like parts throughout the several views.

Referring to the drawings:

Fig. 2 is a view partly in side elevation and partly in vertical section, showing the scale mechanism on a larger scale than in Fig. 1; and Figs. 3 and 4 are enlarged views chiefly in side elevation, but partly in vertical section, showing portions of the garner, the scale hopper and the upper scale mechanism.

Figure 1:
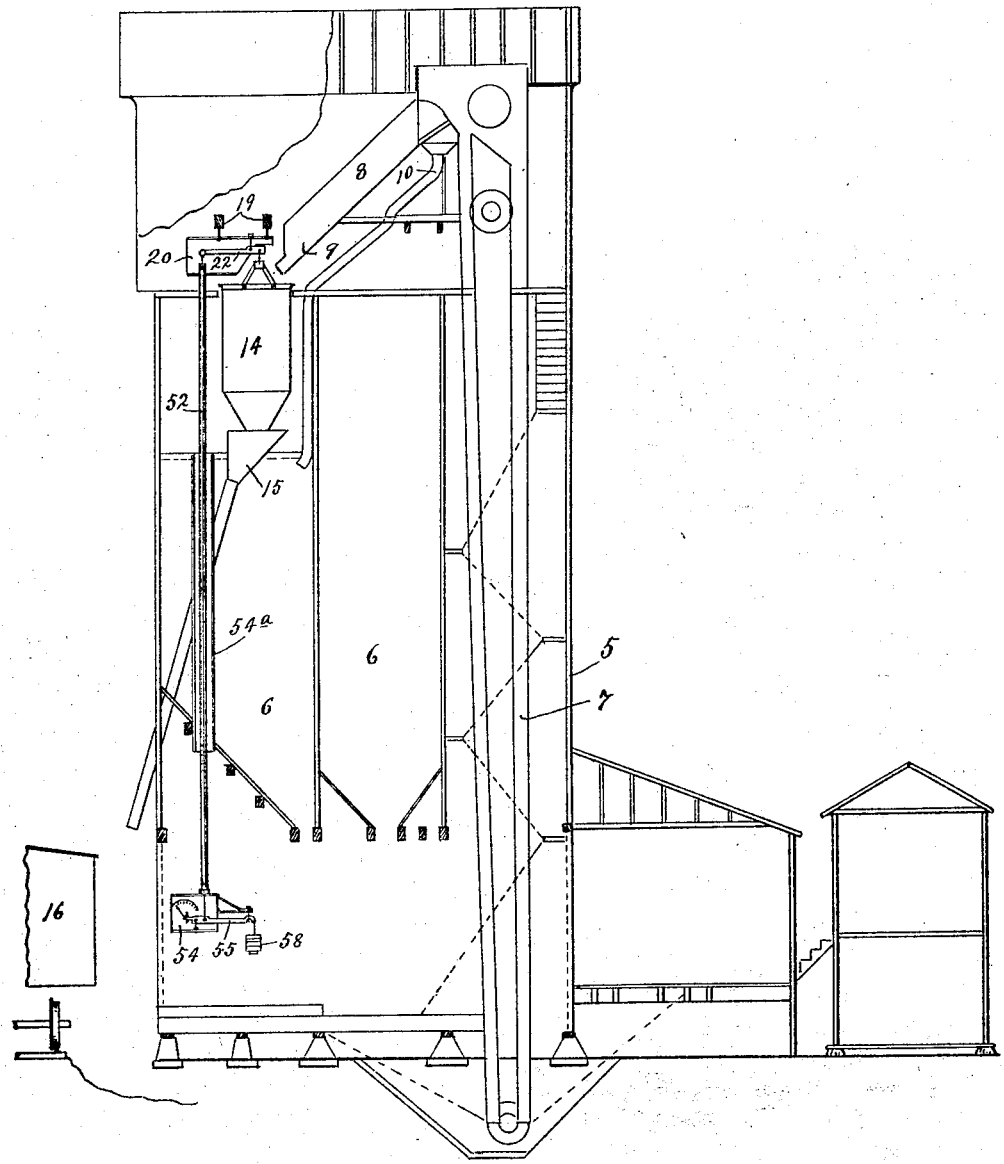
Figure 1 is a view in diagrammatic elevation showing the improved scale applied to an ordinary grain storage or country elevator.

Of the parts of the elevator structure, the numeral 5 indicates the main building, the numeral 6 certain of the grain bins thereof, and the numeral 7 the grain elevator, which latter delivers to a garner 8 having the usual discharge spout 9 and overflow spout 10. The discharge spout 9 is arranged to be opened and closed by a gate 11 carried by a yoke 12 pivoted to the sides of said spout and connected thereto by a toggle link 13, which, when straightened, opens said gate and, when buckled, closes said gate. The spout 9 delivers to a scale hopper 14, which, in turn, delivers to the upper end of a shipping spout 15 and is adapted to deliver to a car 16 on a track at one side of the elevator. The scale hopper 14 has a counter-weighted discharge gate 17 hinged thereto at 18.

The numeral 19 indicates overhead beams of the elevator superstructure, and which are located above the bins 6. The lever supporting frame is in the form of a casing 20 that is suspended from the beams 18 with freedom for lateral swinging movement, as shown, by means of interconnected eye bolts 21. The main lever 22 of the scale mechanism, is hung from and carried by the casing 20, this, as shown, being accomplished by means of a fulcrum yoke 23 hung from a hook bracket 24 on said casing and having eyes that engage fulcrum lugs on said lever.

The scale hopper 14, on top, has a hood-like bracket 25 connected to the sides thereof, by metal strips 26$^a$; and the upper portion of this hood 25 is pivotally connected to the lower end of a hanger yoke 26 that is pivotally hung on the short end of the main scale lever 22, so that the said hopper is suspended entirely from the said scale lever. This, however, is the usual construction.

Journaled in the lower portion of the hood 25 is a short rock shaft 27 that is provided with a weighted arm 28, a trip arm 29 and a crank arm 31. The said crank arm 31 is connected by a link 30 to the long end of an upper gate closing lever 32. This lever 32, near its other end, is pivoted at 33 to a bearing 34 on the lower portion of the casing 20. The rock shaft 27, at one end, has a crank arm 35 pivotally connected to the upper end of a gate actuating rod 36, the lower end of which is pivotally connected to the hopper gate 17. Here it should be noted (see Figs. 2 and 3) that normally, or when the gate 17 is closed, the crooked upper end of the rod 36 stops against the rock shaft 27 and limits the movement of the crank arm 35 in the one direction, to a position in which it is slightly beyond a dead center, and will, therefore, automatically hold the gate in its closed position against the weight of the load of grain in the hopper.

The numeral 37 indicates a latch bar, one end of which is pivotally connected to the intermediate joint of the toggle 13. This lever 37 is at one side of the hood 25 and near its extended end, it has a longitudinal slot 38 that engages a fixed guide pin 38$^a$ secured to and projecting from the sides of the casing 20. At its extended end, this latch bar 37 has a latch lug or shoulder 39 that engages a coöperating shoulder 40 on the main scale lever 22 when the garner gate 11 is open and the scale hopper has not yet been filled to the predetermined weight.

Mounted in the intermediate portion of the casing 20 below the lever 22 and latch bar 37, is a second rock shaft 41 provided with four arms 42, 43, 44 and 45. To the arm 45 is attached a long operating rod 46, the lower end of which terminates in a position which may be reached from the first floor of the elevator. In the position of the parts shown in Fig. 3, in which position, the hopper gate is closed and the garner gate is open, the end of the arm 43 overlies a lock lug 47 secured on an arm 48 rigidly secured to and carried by the latch bar 37, so that it is impossible at this time to open the hopper gate, or to close the garner gate, which actions, as will presently be noted, are automatically accomplished when the load of the proper weight has been delivered into the scale hopper.

The arm 42 coöperates with a pivoted latch bar restoring dog 49 pivoted to said latch bar. The said arm 42 is also pivotally connected to one end of a trip rod 50, the extended end of which is adapted to be thrust against the trip arm 29 of the rock shaft 27, and the intermediate portion of which works through a guide 51 shown as supported by the bearing 34.

The numeral 52 indicates a long vertical pendulum, preferably of tubular form, the upper end of which is pivotally connected at 53 to the scale lever casing or frame 20, for swinging movements in a plane at a right angle to the plane of lateral oscillation of said casing. This long tubular pendulum is freely suspended and gravity-held, always in a vertical position, and it extends down through the bin structure, or other part of the elevator, to a position reasonably close to the first floor of the building. As shown, this pendulum 52 works with ample clearance through a tubular housing 54$^a$ shown as extended through one of the bins 6. A so-called beam box or supporting frame 54 is secured to the lower end of the tubular pendulum 52, and the scale beam 55 is fulcrumed thereto at 56, in the usual or any suitable way. A long beam rod 57 is extended freely through the tubular pendulum 52, and at its upper end, it is hung from the free end of the main scale lever 22, and at its lower end, is connected to the scale beam 55. This rod 57 has no contact whatever with the said pendulum or with any of the parts except the said scale lever and beam.

The numerals 58 and 59 indicate the customary beam weights. The numeral 60 indicates a pointer that coöperates with a scale 61 on the beam box and is operated automatically from the scale beam in any suitable way, which, however, constitutes no part of the present invention.

The lower end of the operating rod 46 is pivoted to the intermediate portion of an operating lever 62, which, as shown, is pivoted to a suitable support near the first floor and, as shown, is provided with a dog 63 for operating a tally 64 of a construction not necessary for the purposes of this case to consider.

As is evident in the above described scale, the so-called pendulum which supports the scale beam is universally free for swinging movement. More properly speaking, it does not swing at all in respect to a vertical position, but retains a vertical position, regardless of changing positions of the elevator structure or building in which it is installed. The accuracy of the scale is, therefore, always maintained.

In what may be assumed to be normal positions, the gates on both of the garners or grain supply spout, and of the scale hopper, will, of course, be closed. Figs. 2 and 3, show the hopper gate closed but the garner gate open, so that grain will then run into the scale hopper. When the grain in the hopper reaches the predetermined weight for which the scale is set, the said hopper will lower, thereby raising the free end of the scale, main lever 22 and carrying its lock shoulder 40 out of engagement with the lock shoulder 39 of the latch bar 37. This releases the said bar 37, and permits the garner gate 11 to be closed under the action of gravity; and here it should be noted that this automatic closing of the gate and movement of the latch bar 37 toward the right and into position shown in Fig. 3, are made possible because the toggle 13 is normally partly buckled, or at one side of its dead center.

Of course, closing of the gate 11 stops further supply of grain into the scale hopper. The above noted movement of the latch bar 37 toward the right carries the lock lug 47 out of the path of movement of the arm 43, so that the operating rod 46 may then be forced upward when desired. Opening of the hopper gate is effected by pushing the operating rod 46 upward and thereby rocking the shaft 41 so as to move its several arms from the positions shown in Fig. 3 to position shown in Fig. 4. This movement of the said rock shaft and its arms causes the trip rod 50 to press against trip arm 29 of rock shaft 27, thereby throwing arm 35 to the left side of its dead center, and thus releasing the rod 36 and permitting the same to drop into the position shown in Fig. 4, thereby opening the hopper gate and effecting the discharge of grain from the hopper, which grain, of course, passes through spout 15 to the car. It will be noted that the weighted arm 28 of the rock shaft 27 is moved from one side to the other of a vertical position, so that it tends to hold the said rock shaft in either of the positions in which it may be set. This gate, however, is not sufficient to overcome the weight $17^a$ of the hopper gate 17, and hence, as soon as the load is discharged from the scale hopper, the said weight $17^a$ will automatically close the said gate and again throw the weighted arm 28 to the right of its vertical position and raise the crank 35, thereby again closing and locking the hopper gate. This movement, however, does not again open the garner gate 11, but before considering the opening action of the latter, attention is again directed to Fig. 4, which shows the position of the parts while the hopper gate is open and the load is being discharged. In this position, it will be noted that the short end of the latch bar 32 is in the path of movement of the arm 44, so that the operating rod 46, at such time, can not be drawn downward, and hence, as will presently be more clearly understood, the said garner gate can not possibly be opened while the hopper gate is open.

Of course, as soon as the hopper pocket is relieved from its load, it will be again raised by the main scale beam 22, the long end of the latter being again swung downward. The opening of the garner gate is produced by pulling downward on the operating rod 46 at a time when, as above noted, the upper gate is closed and the short end of the latch bar 32 is pressed downward. When the operating rod 46 is pulled downward, the trip rod 50 will be retracted and the arms 42, operating on the dog 49, will force the latch bar 37 toward the left and reëngage the shoulder 39 thereof, with the shoulder 40 of the then depressed scale lever 22, thereby opening the garner gate and again setting the parts in the position shown in Fig. 3.

As already indicated, the salient feature of the present invention is found in the manner of supporting the scale beam. This scale beam, even in itself, or with its weights, constitutes one form of weight indicator, but it may be associated with a scale and pointer for giving an additional and more easily readable weight indication. It may also be properly described as a lower load equalizing device, while the upper or main scale lever may be properly described as an upper load equalizing device, and from a broad point of view, these upper and lower load equalizing devices may take various forms, but they must be interconnected so that they coöperate in equalizing or supporting the load. It is not only important, as already pointed out, that these upper and lower load equalizing devices be connected in such manner that the latter may assume its natural position under the action of gravity, without interference from the building structure, but it is of the utmost and vital importance that the vertical connection between the two have a constant dimension and be not affected by settling of the building. This can be accomplished only by providing a pendulum or depending supporting column that is supported only at its upper end. Otherwise stated, the support for the scale beam or lower load equalizing device should not be attached to a lower floor or to any of the adjacent lower parts of the building, because if thus supported, it would be materially affected by shrinkage and settling of the building, and the connection between the upper and lower load equalizing device would not remain constant.

The term "garner" is herein used in a broad sense to include any kind of a device for supplying grain or other material to the hopper. The term "hopper" is also used in a broad sense to include any kind of a receptacle which is suspended from the scale mechanism and adapted to receive and discharge the grain or other material.

What I claim is:

1. A self-contained scale mechanism, comprising interconnected upper and lower load equalizers, and a hopper suspended from said upper load equalizer, all of said parts being gravity arighted.

2. A scale comprising upper and lower load equalizers, a depending hanger carrying said lower load equalizer at its lower end and itself supported from its upper end so that its lower end will be unaffected by settling of the building in which it is hung, an operating connection between said upper and lower load equalizers, and a gravity-arighted hopper suspended from said upper load equalizer.

3. A scale comprising upper and lower load equalizers, a depending column carrying said lower load equalizer at its lower end and itself supported from its upper end, and an operating connection between said upper and lower load equalizers.

4. A scale comprising upper and lower load equalizers, a depending column carrying said lower load equalizer at its lower end and itself supported from its upper end with freedom for swinging movements, whereby it is arighted by gravity, and an operating connection between said upper and lower load equalizers.

5. A scale comprising upper and lower load equalizers, a depending column carrying said lower load equalizer at its lower end, and itself supported from its upper end, an operating connection between said upper and lower load equalizers, and a scale hopper suspended from said upper load equalizer.

6. A scale comprising upper and lower load equalizers, a depending tubular column hung from its upper end and having at its lower end a support for said lower load equalizer, and a rod extended through said tubular column and connecting said upper and lower load equalizers.

7. A scale comprising upper and lower load equalizers, a depending tubular column hung from its upper end and having at its lower end a support for said lower load equalizer, and a connection extended through said tubular column and connecting said upper and lower load equalizers, the said column being free for swinging movements at its lower end, whereby it will be arighted by gravity.

8. In a scale, the combination with an upper load equalizer including a main scale lever, of a scale hopper supported from said main lever, a lower load equalizer including a scale beam, a column hung from its upper end and provided at its lower end with a fulcrum for said scale beam, and a connection from said main scale lever to said scale beam, following said column but out of contact therewith.

9. In a scale, the combination with a support hung for lateral swinging movements, a main scale lever fulcrumed to said support, a hopper supported from said main scale lever, a depending column hung from said support and carrying a beam fulcrum at its lower end, a scale beam mounted on the said beam fulcrum, and a connection from said scale lever to said scale beam following said column but out of contact therewith.

10. A scale comprising an upper lever mechanism, a gravity suspended self-arighting column hung from its upper end and provided at its lower end with a beam support, a scale beam fulcrumed to said beam support, and a connection between the said beam and said upper lever mechanism.

11. In a scale, the combination with a garner having a discharge gate, of scale mechanism including a scale lever, a scale hopper supported from said lever in position to receive from said garner, said hopper having a gate, and interconnected operating devices for said garner and hopper gates including latch devices arranged to prevent opening of said hopper gate while said garner gate is open, and to prevent opening of said garner gate while said hopper gate is open.

12. The combination with an elevated scale mechanism, and a scale hopper suspended therefrom, of a garner delivering to said hopper, said garner and hopper having discharge gates, and mechanism for operating said gates, including an operating connection extending downward to a lower point remote therefrom.

13. A scale with a suspended gravity arighted scale mechanism and a scale hopper hung therefrom, of a garner delivering to said hopper, said hopper and garner having discharge gates, independent gate operating connections for said two gates, and a common operating device for the said two actuators, including a connection extended downward to a point remote from the said hopper.

14. In a scale mechanism, the combination with a main scale lever and a hopper suspended therefrom, of a garner arranged to deliver to said hopper and provided with a gate, a latch bar connected to and operating said garner gate, the said lever and latch bar having parts that interlock when said garner gate is raised and said garner gate is opened, the said interlocking connection being released by downward movement of said hopper.

15. In a scale, the combination with upper and lower equalizing devices and an operating connection between the two, of a hopper suspended from said upper load equalizer, a garner delivering to said hopper, said hopper and garner having gates for controlling the discharge, respectively, therefrom, and mechanism for operating said two gates, including an operating connection extended downward from said upper load equalizer to a point in the vicinity of said lower equalizer.

16. In a scale, the combination with upper and lower equalizing devices and an operating connection between the two, of a hopper suspended from said upper load equalizer, a garner delivering to said hopper, said hopper and garner having gates for controlling the discharge, respectively, therefrom, and mechanism for equalizing said two gates, including an operating connection extended downward from said upper load equalizer to a point in the vicinity of said lower equalizer, the said lower load equalizer being suspended from a point in the vicinity of said upper load equalizer.

17. A scale comprising a gravity-arighted upper load equalizer, a depending hanger hung from its upper end, a lower load equalizer carried by the lower portion of said hanger, an operating connection between said upper and lower load equalizers, and a scale hopper carried by said upper load equalizer.

18. A scale comprising gravity-arighted upper and lower load equalizers, an operating connection between said upper and lower load equalizers, and a hanger hung from its upper end and supporting said lower load equalizer in predetermined vertical relation to said upper load equalizer, independently of the structure in which the scale is installed.

19. The combination with an inclosing structure, such as a grain elevator, the said structure having bins therein, of a scale comprising upper and lower load equalizers, respectively, in the vicinity of the upper and lower portions of said bins, an operating connection between said two load equalizers, a hanger supported from said structure at its upper end and at its lower end, carrying said lower load equalizer and holding the same in predetermined vertical relation to said upper load equalizer, independently of said structure.

20. The combination with an inclosing structure, such as a grain elevator, the said structure having bins therein, of a scale comprising upper and lower load equalizers, respectively, in the vicinity of the upper and lower portions of said bins, an operating connection between said two load equalizers, a hanger supported from said structure at its upper end and at its lower end, carrying said lower load equalizer and holding the same in predetermined vertical relation to said upper load equalizer, independently of said structure, and a hopper suspended from said upper load equalizer.

21. The combination with an inclosing structure, such as a grain elevator, the said structure having bins therein, of a scale comprising upper and lower load equalizers, respectively, in the vicinity of the upper and lower portions of said bins, an operating connection between said two load equalizers, a hanger supported from said structure at its upper end and at its lower end, carrying said lower load equalizer and holding the same in predetermined vertical relation to said upper load equalizer, independently of said structure, and a hopper suspended from said upper load equalizer, the said upper and lower load equalizers and hopper being gravity-arighted.

22. In a scale, the combination with a gravity-arighted support, and a hanger depending therefrom, of an upper load equalizer mounted on and carried by said gravity-arighted support, a lower load equalizer carried by the lower portion of said hanger, and an operating connection between said two load equalizers.

23. In a scale, the combination with a gravity-arighted support, and a hanger depending therefrom, of an upper load equalizer mounted on and carried by said gravity-arighted support, a lower load equalizer carried by the lower portion of said hanger, an operating connection between said two load equalizers, and a gravity-arighted hopper suspended from said upper load equalizer.

24. In a scale, the combination with a gravity-arighted support, and a hanger depending therefrom, of an upper load equalizer mounted on and carried by said gravity-arighted support, a lower load equalizer carried by the lower portion of said hanger, an operating connection between said two load equalizers, a gravity-arighted hopper suspended from said upper load equalizer, a garner delivering to said hopper, said garner and hopper having independent gates, and mechanism operated by said upper load equalizer for automatically closing said garner gate.

25. In a scale mechanism, the combination with upper and lower load equalizers and an operating connection between the two, of a hopper supported by said upper load equalizer, a garner delivering to the said hopper, said hopper and garner having gates for controlling the discharge, respectively, therefrom, means for independently but automatically closing said garner and hopper gates, and means operative, at will, for independently opening said garner and hopper gates.

26. In a scale mechanism, the combination with an upper load equalizer, a lower load equalizer and an operating connection between the two, of a hopper supported by said upper load equalizer, a garner delivering to said hopper, said hopper and garner having gates for controlling the discharge, respectively, therefrom, automatic mechanism associated with said upper load equalizer, hopper and garner gates, and gate actuating connections for opening said two gates, at will, said gate actuating connections being extended downward to the vicinity of said lower load equalizer.

27. In a scale mechanism, the combination with upper and lower load equalizers and an operating connection between the two, of a hopper supported by said upper load equalizer, a garner delivering to the said hopper, said hopper and garner having gates for controlling the discharge, respectively, therefrom, means for independently but automatically closing said garner and hopper gates, and means operative, at will, for independently opening said garner and hopper gates, and latch mechanism associated with said upper load equalizer and operative to prevent either one of the said gates from being opened when the other is already open.

In testimony whereof I affix my signature in presence of two witnesses.

CHARLES E. BIRD.

Witnesses:
HARRY D. KILGORE,
FRANK D. MERCHANT.

Copies of this patent may be obtained for five cents each, by addressing the "Commissioner of Patents, Washington, D. C."